US008990807B2

(12) United States Patent
Wu et al.

(10) Patent No.: US 8,990,807 B2
(45) Date of Patent: Mar. 24, 2015

(54) VIRTUAL INSTANCE RECONFIGURATION

(75) Inventors: Jiatai Wu, Santa Clara, CA (US);
Krishna Kattumadam, Santa Clara, CA (US)

(73) Assignee: VCE Company LLC, Marlborough, MA (US)

( * ) Notice: Subject to any disclaimer, the term of this patent is extended or adjusted under 35 U.S.C. 154(b) by 250 days.

(21) Appl. No.: 13/570,683

(22) Filed: Aug. 9, 2012

(65) Prior Publication Data
US 2014/0047437 A1   Feb. 13, 2014

(51) Int. Cl.
*G06F 9/46* (2006.01)
*G06F 9/455* (2006.01)

(52) U.S. Cl.
CPC .................. *G06F 9/45545* (2013.01)
USPC ........................................................ 718/1

(58) Field of Classification Search
CPC .................................................. G06F 9/45545
USPC ........................................................ 718/1
See application file for complete search history.

(56) References Cited

U.S. PATENT DOCUMENTS

2013/0198319 A1*   8/2013   Shen et al. .................... 709/217

* cited by examiner

*Primary Examiner* — Camquy Truong
(74) *Attorney, Agent, or Firm* — Jenkins, Wilson, Taylor & Hunt, P.A.

(57) ABSTRACT

In a virtual computing environment allocating instantiations of computing resources based on a computing metric of a primary application for execution on the instantiated computing resources, an instance manager increases allocated computing resources in response to a performance shortfall. The virtual computing environment executes virtualization instances of computing systems as an autonomous computing entity in a physical environment shared with other virtualization instances. Each virtualization instance has a configuration including a processor type and quantity, memory, and mass storage (i.e. disk) allocation. Further, each virtualization instance has a performance capacity (capacity) based on a performance metric for identifying throughput in terms of a target application that the virtualization instance was designated to support. The instance manager performs a substantially real-time reconfiguration response based on an impact analysis that configures additional computing resources (virtualization instances) based on an actual, not computed or projected, demand.

31 Claims, 15 Drawing Sheets

Fig. 15

VIRTUAL INSTANCE RECONFIGURATION

BACKGROUND

Conventional computing resources involve deployment of physical hardware at the user site for providing the computing and storage requirements of the user. Further, the deployed configuration must be sufficient to provide acceptable performance at peak demand times, which may be substantially greater than an average load. Therefore, a large user base such as a corporation, university or other enterprise was forced to invest substantially in sufficient on-site resources to handle peak demand, in addition to allowing for an expected demand growth to avoid rapid obsolescence.

Advances in network technology, fueled in no small part by the Internet and other public access networks, however, have brought about networking capabilities sufficient to remove the users from the physical hardware environment and exchange computing resource requests and services remotely via a networked connection. Such performance has resulted in so-called "software as a service" (SaaS), or "cloud computing," in which users such as corporations invoke remote servers for computing resources as needed, and thus pay only for a current level of resources demand. This relieves the need for investment in "worst case" system sizing and allows deployment of additional computing resources only when actually needed.

SUMMARY

A virtual computing environment executes virtualization instances of computing systems as an autonomous computing entity in a physical environment shared with other virtualization instances. Each virtualization instance has a configuration including a processor type and quantity, memory, and mass storage (i.e. disk) allocation. Further, each virtualization instance has a performance capacity based on a performance metric for identifying throughput in terms of a target primary application that the virtualization instance was designated to support. The performance metric is an enumeration of operations typically performed by the target application that the virtualization instance can complete per unit time, such as transactions per minute, web pages per hour, packets per second, etc.

The performance metric is defined by a baseline developed, computed or derived from application operation on a particular configuration, meaning that a certain number of operations (performance metric) is achievable with a configuration including a certain number of processors at a particular speed having access to a given memory allocation. For example, user sites are often deployed with a configuration defining an initial state suitable for handling a number of expected operations, plus a "burst" or "spike" allowance to accommodate typical deviations. However, user demands often expand as a system matures. Over time, expectations placed on the application cause the initial state of the virtualization instance to result in a performance shortfall in meeting additional operations requested of it.

In the case of particular applications, the performance metric establishes a 'bridge' connecting certain business application and its throughput with the ideal and benchmark tested 'cloud' infrastructure settings, or configuration. For a particular application, such as a database application as depicted below, an operation is selected as an exemplary exchange or transaction that is the unit of performance. Subsequent cloud configurations, also discussed further below, provide for a performance level in terms of a number of these operations. The various configurations are therefore normalized by the benchmark number of operations that they achieve.

The aforementioned SaaS or cloud based approach typically involve a bank of servers that deploy virtual configurations for each of a plurality of users. The bank of servers deploy "virtualization instances" which provide a user experience similar to a dedicated machine having a predetermined CPU and memory capability defined by a configuration of the virtualization instance.

Configurations disclosed herein are based, in part, on the observation that deployment of virtual hardware in the form of virtualization instances (or simply "instances") can result in overprovisioning (excessive computing power for the demand) or underprovisioning (insufficient resources). Effectiveness of a virtualized computing resource, as opposed to installed hardware, relies on optimizing required resources by neither over-configuring or under-configuring the computing resources needed to handle a current load, since the provisioned configuration is malleable and not fixed as a room full of hardware.

Unfortunately, conventional approaches suffer from the shortcoming that a large base of installed hardware is required for handling short-term bursts or spikes in usage in order to avoid a shortfall in resources. Even if virtualization instances are deployed, reconfiguration required for handling a spike or burst in demand may not be timely.

Accordingly, configurations herein substantially overcome the above described shortcomings by performing a substantially real-time reconfiguration response that configures additional computing resources (virtualization instances) based on an actual, not computed or projected, demand. The disclosed approach allows users such as corporations to effectively invoke remote servers having virtualization instances for computing resources as needed, and thus pay only for a current level of resource demand as the allocated computing resources provide substantially real-time response to a demand spike or surge, thus "elasticizing" applications to expand and contract to meet current demand. Such virtualization instances differ from conventional mainframe and terminal approaches because each user has a dedicated OS and processor unaffected by other users, in contrast to the conventional approaches where all users consumed a portion of a single available CPU in a shared or "time sliced" manner.

A typical response to such underprovisioning is to clone the virtualization instance of the initial state with a configuration (e.g. processor and memory) sufficient to overcome the performance shortfall by providing a corresponding increase in performance metrics. However, arbitrarily cloning a virtualization instance does not necessarily lend an exacting or mathematical correspondence to the resultant throughput. Often, the baseline of a particular virtualization instance is based on an unadulterated, or "pure" instantiation running only the target application for which the operations apply. In practice, the instantiation has often been burdened with additional applications and/or overhead such that mere cloning does not achieve the expected baseline.

Accordingly, attempts to overcome a performance shortfall by determining an additional demand based on a performance metric (operations) for accommodating the additional load is likely to fall short of a true performance metric required to adequately handle the new load. The difference defines an extrinsic load resulting from modifications and overhead demands outside of a "pure" instantiation designated for handling only the target application. Accordingly, a true performance metric that accounts for the computed additional load and the extrinsic load over the initial performance metric identifies computing resources sufficient to handle the additional load. The identified computing resources define a configuration including a number of processors (and speed), memory, and disk resources corresponding to the true performance metric to accommodate the identified performance shortfall. The identified computing resources therefore define a configuration, including processors, memory and disk as exemplary components. Alternate combinations of computing resources available via a cloud infrastructure may also be defined in a configuration geared to supporting a specific performance metric, i.e. number of operations of a target application, as discussed further below.

In further detail, the method for configuring a virtualization instance as disclosed herein includes instantiating a virtualization instance according an initial configuration, such that the initial configuration is based on performance demands of a target, or primary, application. Operational conditions result in an indication of a performance shortfall of a virtualization instance, in which the performance shortfall is based on a computing metric indicative of a measure of computing resources for performing an operation by a primary application for which the virtualization instance is configured to handle. The method includes determining, based on an impact analysis of a current state of the virtualization instance and the performance shortfall, a revised configuration having sufficient computing resources for handling a true computing demand including the performance shortfall, such that the current state includes an increase in computing demand beyond the initial configuration.

In the example arrangement discussed herein, in the virtual computing environment allocating instantiations of computing resources based on a computing metric of a primary application for execution on the instantiated computing resources, a method for increasing allocated computing resources includes receiving a load metric indicative of an additional load on an initial computing instantiation, such that the load metric defines a measure of additional computing resources responsive to the additional load. The impact analysis computes a true performance metric based on the received load metric for handling the additional load and extrinsic loads added after the initial computing instantiation, and instantiates an additional computing resource configured based on the computed true performance metric. In a particular configuration, a virtualization server 'translates' the business application's throughput (BATs), typically measured by business transactions/number of users, or other operations with the ideal and benchmark tested 'cloud' infrastructure settings, or configuration. A program can be built on top of this 'translation tool' to manage short-term bursts/spikes or on demand usage from a business application to achieve automatic application elasticity by instantiating additional VMs to meet demands.

Alternate configurations of the invention include a multi-programming or multiprocessing computerized device such as a multiprocessor, controller or dedicated computing device in either a handheld, mobile, or desktop form or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIG. 15 is a screen view of additional computing resources configured in response to the request of FIG. 14.

DETAILED DESCRIPTION

The disclosed configuration performs an impact analysis using an initial configuration based on an initial performance metric (i.e. such as N operations per hour), and a load metric indicative of additional load need (N additional operations per hour). A true performance metric is based on the initial performance metric, in which the load metric and an extrinsic load were unaccounted for in the additional load, which includes extraneous and user imposed factors such as additional software and overhead not accounted for in a "computed" or "projected" additional load of the primary application. An instance manager then deploys a revised configuration for handling the true performance metric defined in terms of operations of the primary application.

Computing resources are often measured in terms of a computing metric, or simply "metric," that defines a number of operations of a target application per unit time. Upon an initial deployment, the computing resource has a configuration deemed acceptable for handling an expected computing load defined by the computing metric. For example, a database application, such as SAP, may define so-called "SAPs" per hour, referring to a number of database exchanges (reads and writes) that may be performed. A different target application, such as an Oracle® database, may specify transactions per hour. Other target applications may specify an alternate metric, such as pages per hour for a web page based operation.

For the applicable target application, an initial configuration specifies a combination of computing resources, primarily defined by a number of processors, a processor speed, and available memory (RAM). Disk space may also be specified. This initial configuration is deemed to handle the initial computing load presented by the target (primary) application in an unburdened system. The unburdened system defines a "pure" installation for handling only the target application, without any other applications or extrinsic loads that consume computing resources and thus diminish a true performance metric that defines the number of operations actually achievable as the initial configuration becomes burdened with additional tasks.

Figure 1:
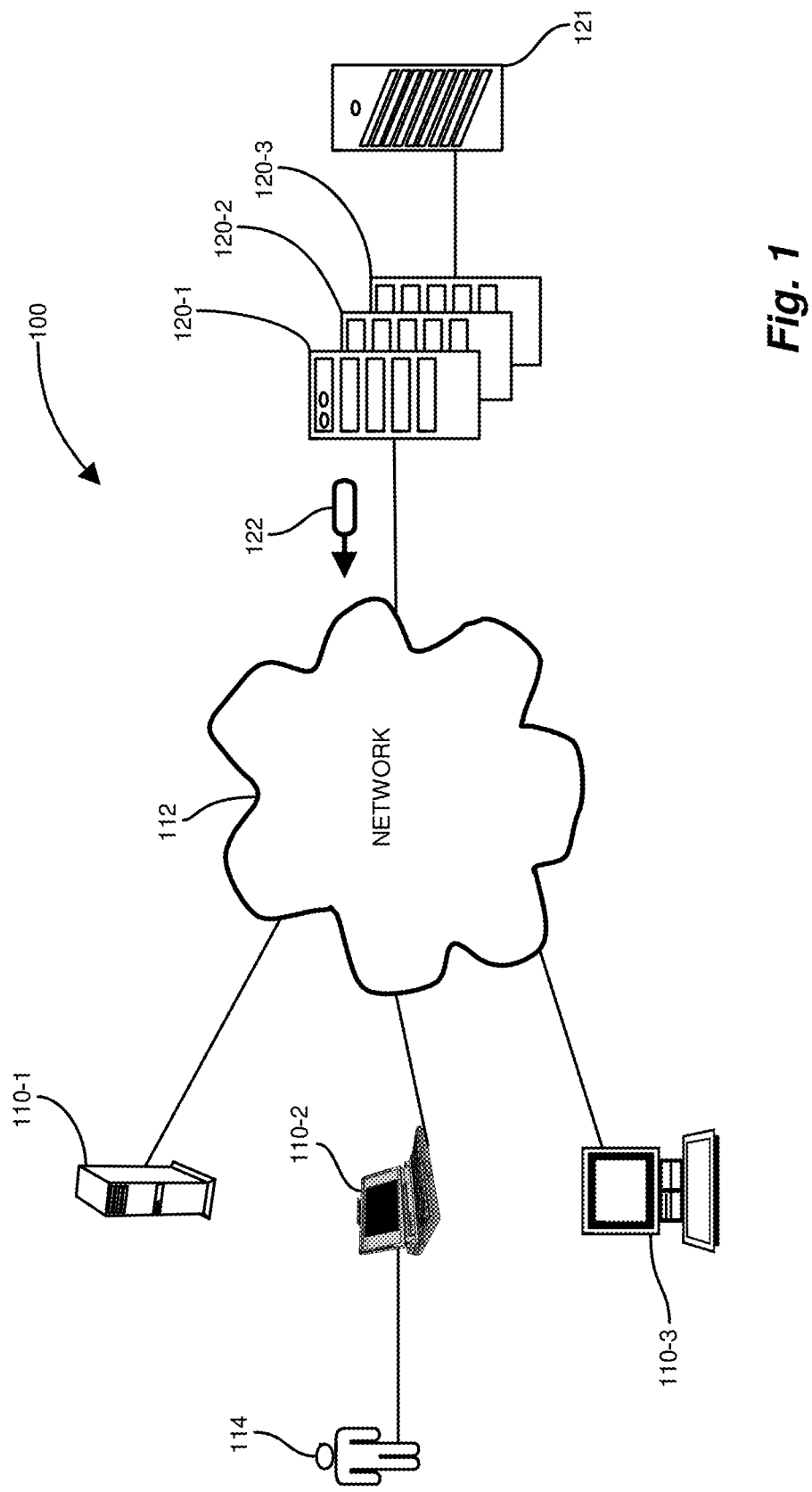
FIG. 1 is a context diagram of a virtualization environment suitable for use with configurations discussed herein.

FIG. 1 is a context diagram of a virtualization environment suitable for use with configurations discussed herein. Referring to FIG. 1, a virtualization environment 100 services a plurality of user devices 110-1 . . . 110-3 (110 generally) with computing services 122 via a computer network 112. The network 112 connects the users to one or more virtualization servers 120-1 . . . 120-3 (120 generally) for providing the computer services 122, sometimes referred to as "cloud" services due to the access via the network 112, rather than on local hardware (processors) on the user device 110.

The virtualization servers 120 (servers), such as a blade server 120, typically have a plurality of processors and memory for allocation to a plurality of users, and an interface to a mass storage subsystem 121, typically a set of disk drives or SSDs (solid state devices). In contrast to conventional multiprogramming environments, however, where multiple users share a single processing environment through an operating system scheduler, a virtualization environment employs an instance manager 123 (FIG. 5, below) for providing each user 114 with a dedicated operating system that appears to be servicing only the particular user device 110, sometimes referred to as a hypervisor. In fact, the hypervisor (or other virtualization technique) is running several operating systems, each dedicated to a particular user. One such hypervisor environment is provided by VMware®, marketed commercially by VMware, Inc., of Palo Alto, Calif. 94304. In other words, the virtualization environment provides each user with a virtualization instance for providing the user with computing services. The virtualization instance appears to each user as a dedicated machine, and the virtualization environment configures each virtualization instance by emulating a particular type and number of processors, memory, and disk resources based on a specified configuration. The virtualization instance therefore effectively provides a user with a computing device configured with a custom processor and memory configuration to suit the user's needs.

The virtualization servers 120, therefore, each include one or more virtualization instantiations 150-1 . . . 150-3 (FIG. 5, 150 generally) for custom configuration according to the needs of a user 114. Typically, each virtualization instantiation 150, also called an instantiation or simply an "instance," is initially configured for performing a primary application 162, discussed further below in FIG. 5, for which the instance 150 is configured to execute. The primary application 162 corresponds to a performance metric indicative of a measure of a primary task it is to perform. For example, in the case of an SAP® database, a "SAP" is a unitary database exchange or operation, and performance is gauged in terms of SAPs per hour. An Oracle® database, similarly, performs transactions per hour. Other applications employ similar operations, such as a number of Outlook® mailboxes or webpages per hour, as a performance metric for defining expectations of an instance. Each instance 150 is therefore configured with an initial configuration to provide a number of operations according to this performance metric, i.e. 1000 SAPs per hour, or 500 transactions per hour.

To meet the performance demand, multiple virtualization instances 150, or VMs (virtual machines) may be configured to execute in parallel. Over time, however, performance of the initial configuration may be surpassed by user demand. An operator may elect to instantiate an additional virtualization instance 150 to address the performance shortfall. Determination of an optimal configuration for meeting the additional demand includes an impact analysis to determine an adequate configuration. The performance shortfall specifies a number of the operations of the primary application, such as a shortfall of 100 SAPs per hour, for example. However, additional user demands may present additional overhead and requirements such that a configuration based simply on the stated shortfall of operations may be insufficient to account for a true performance metric representative of a configuration sufficient to address the actual increase.

In alternate arrangements, various permutations of cloud based computing resources may define a configuration. In practice, the elusive and seemingly infinite "cloud" ultimately resolves to multiple virtual servers competing on/from the same physical resource (like physical CPU/Disk IO/network bandwidth/etc.), however such details are shielded from the user by the cloud infrastructure. Configurations herein normalize the cloud performance in terms of a standardized "operation" deemed to depict a representative transaction, or quantity of computing power, for a target application. A number of operations, therefore, define a performance level attributed to a particular configuration—an allocated combination of cloud resources including, but not limited to, a number and type of processors, memory, and disk (non-volatile storage). Various other attributes of a configuration may be "tuned," or enumerated, to provide a tunable cloud infrastructure, such as in terms of bandwidth, response time, QoS (Quality of service) allocations, and the like.

Figure 2:
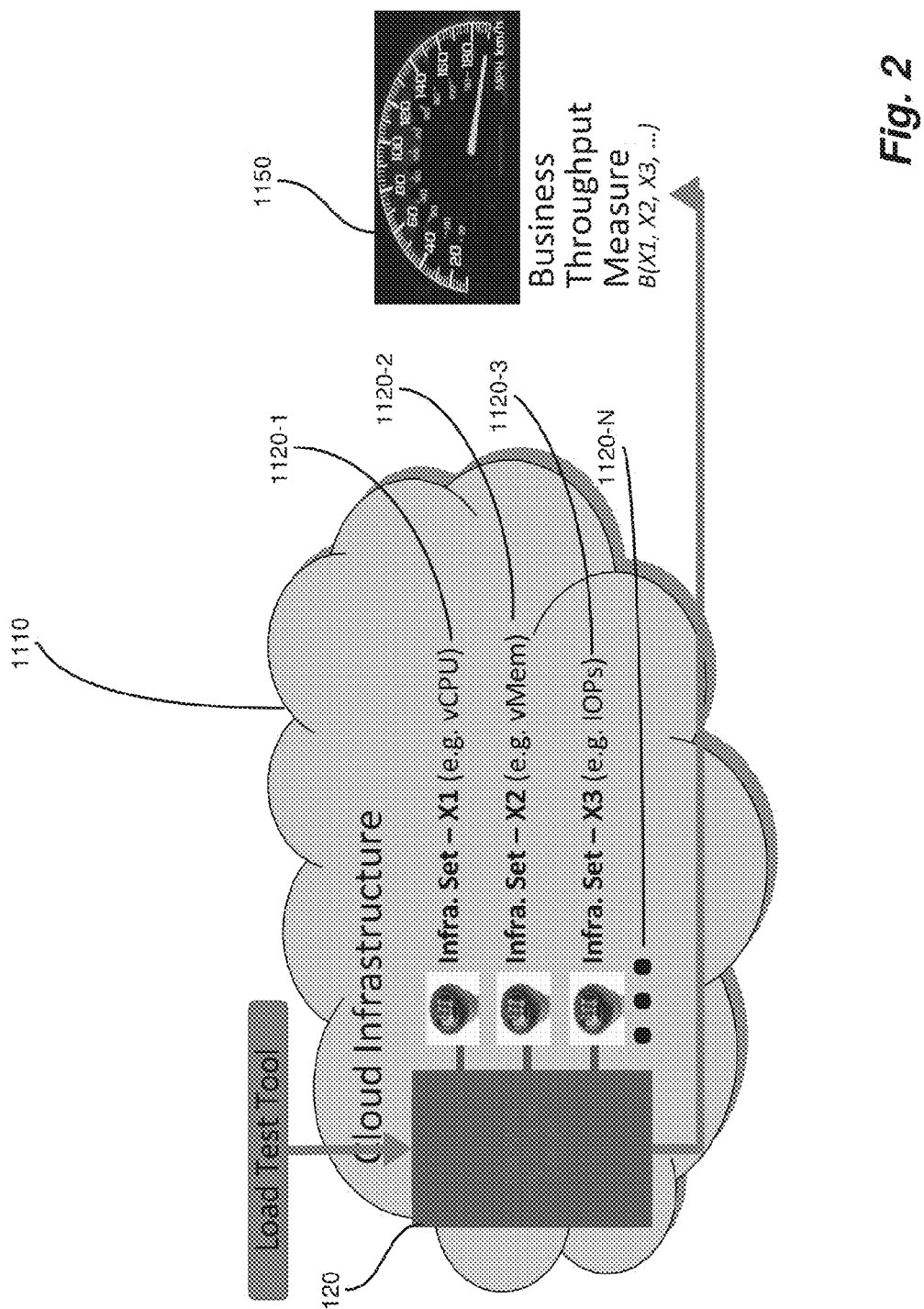
FIG. 2 shows a set of infrastructure variables in the environment of FIG. 1.

FIG. 2 shows a set of infrastructure variables in the environment of FIG. 1. Referring to FIGS. 1-3 and 5, the servers 120 define a cloud infrastructure 1110 such that each instance 150 (FIG. 5) is defined in terms of a set of infrastructure variables 1120-1 . . . 1120-N (1120 generally). More prominent infrastructure variables are CPU 1120-1 and memory 1120-2, as employed in FIG. 3, below. However, additional infrastructure variables 1120 may be employed, such as IO capacity and CPU type and speed, in addition to the number of CPUs. Each virtualization instance 150 employs a combination of infrastructure variables 1120 and achieves a certain number of operations of a target application, shown as a measure of business application throughout (BATs), or a business throughput measure 1150.

Figure 3:
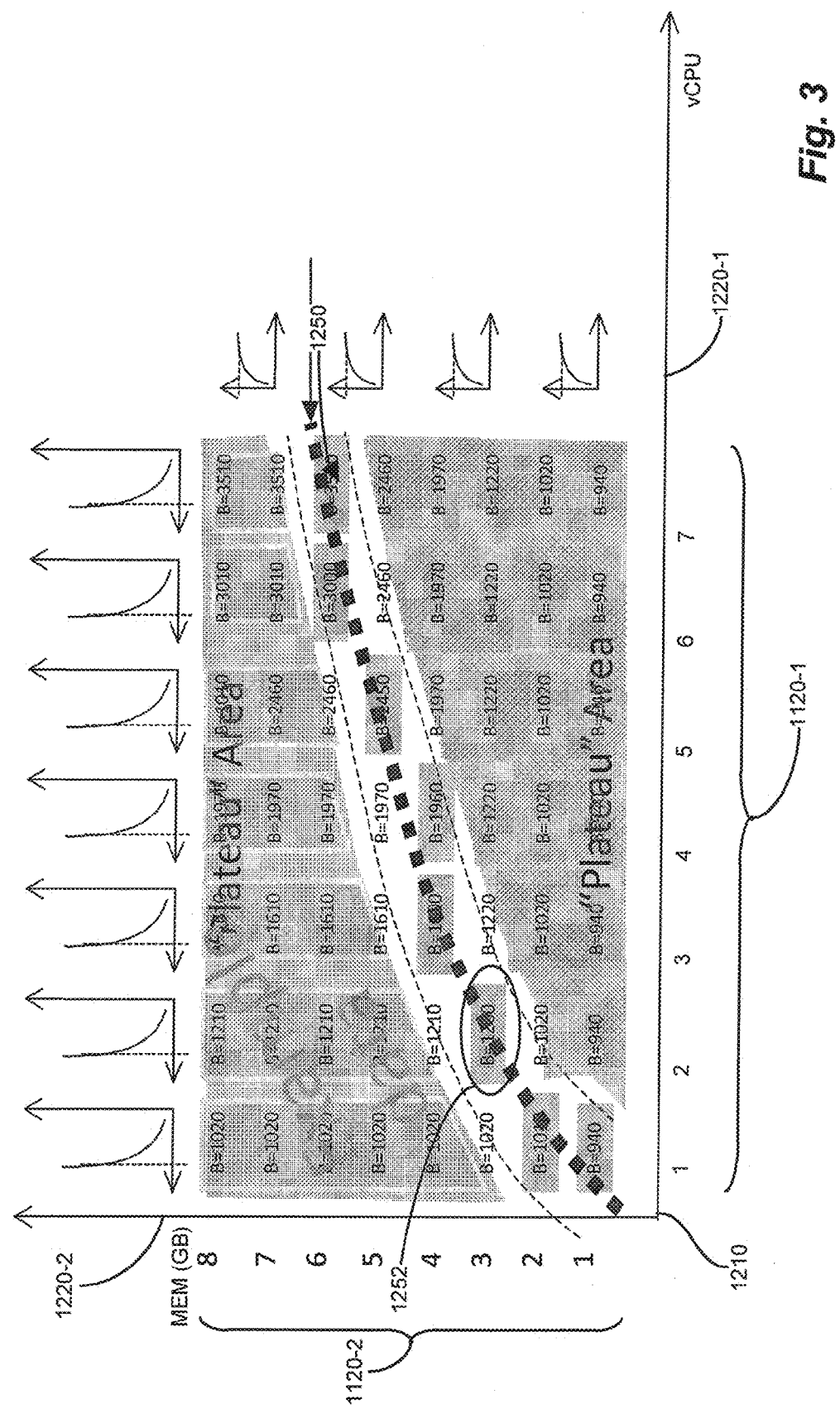
FIG. 3 shows a multidimensional mapping of the infrastructure variables of FIG. 2.

FIG. 3 shows a multidimensional mapping 1210 of the infrastructure variables 1120 of FIG. 2 for measuring business throughput (operations of the target application). The multidimensional mapping 1210 has an axis 1220-1 . . . 1220-N (1220 generally) for each infrastructure variable 1120, shown as No. of CPUs 1120-1 and GBs of memory 1120-2 for example. For a particular target application, the instance manager 123, which may be launched on the server 120 or coupled via the network 112, computes the multidimensional mapping 1210 of infrastructure variables 1120 to application throughput, such that the infrastructure variables are indicative of an allocation of a particular type of computing resource (i.e. memory, CPUs, etc) and the application throughput corresponds to operations of a particular application.

Figure 4:
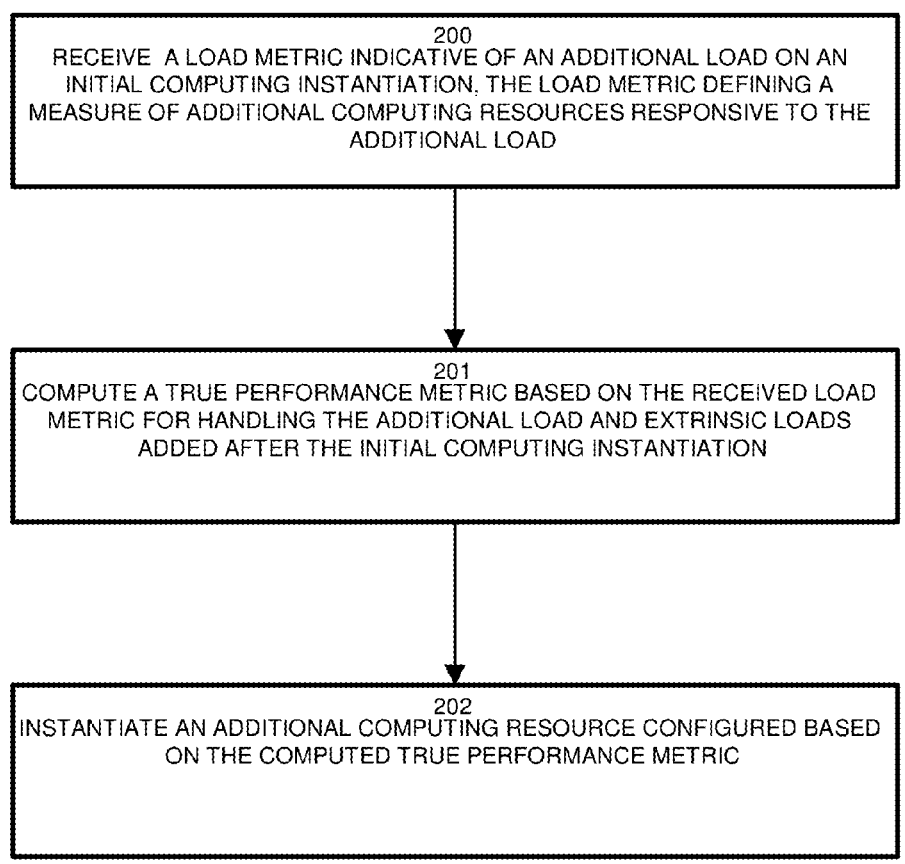
FIG. 4 is a flowchart of computing resource allocation in the environment of FIG. 1

FIG. 4 is a flowchart of computing resource allocation in the environment of FIG. 1. Referring to FIGS. 1 and 2, in the virtual computing environment 100 for allocating instantiations of computing resources based on a computing metric of a primary application for execution on the instantiated computing resources, the method for increasing allocated computing resources as disclosed herein includes, at step 200, receiving a load metric indicative of an additional load on an initial computing instantiation, such that the load metric defines a measure of additional computing resources responsive to the additional load. The method computes a true performance metric based on the received load metric for handling the additional load and extrinsic loads added after the initial computing instantiation, as depicted at step 201. Extrinsic loads correspond to loads unaccounted for by published or predetermined configuration guidelines, and recognize that such a published guideline may assume optimal conditions in an unencumbered system. Accordingly, the instance manager 123 (FIG. 5, below) instantiates an additional computing resource configured based on the computed true performance metric. One particular computation involves an impact analysis, as discussed below.

Figure 5:
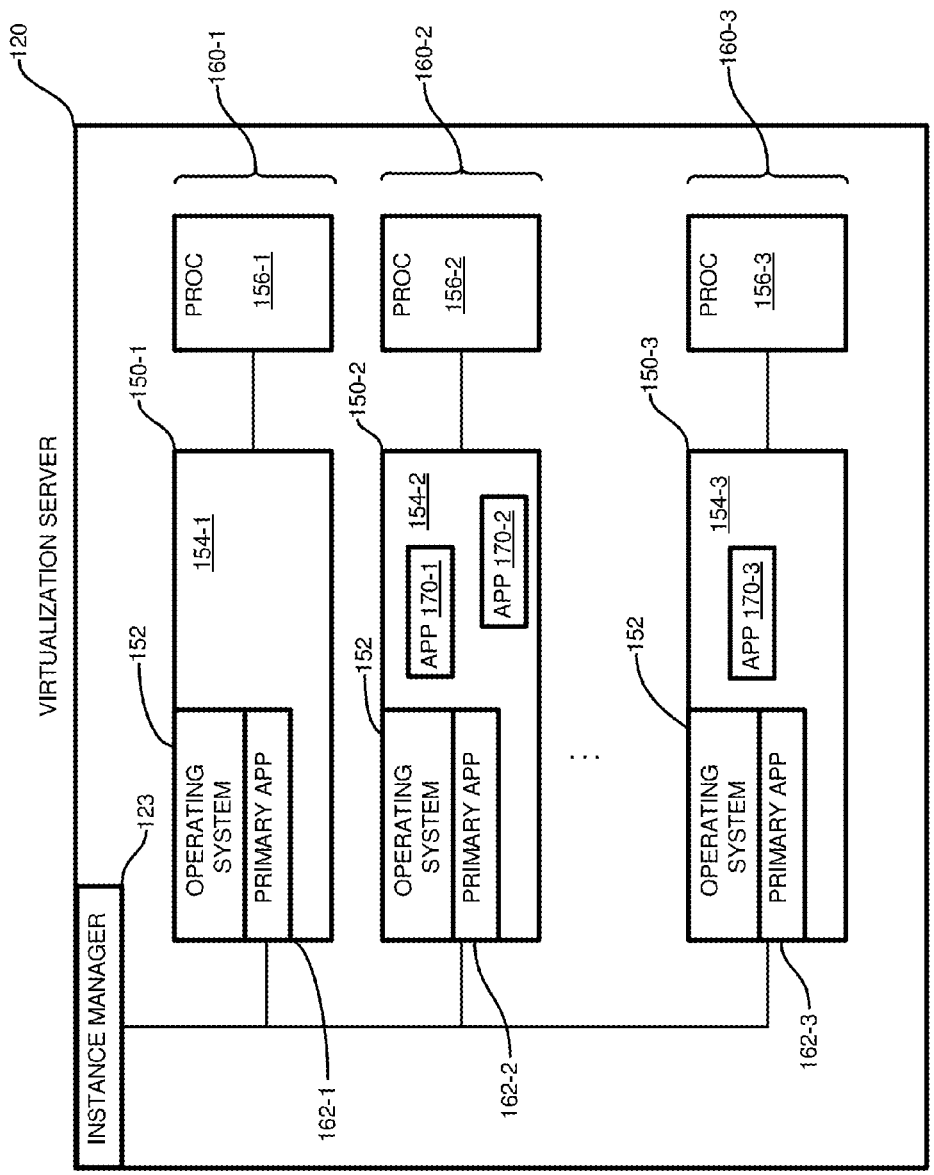
FIG. 5 is a block diagram of virtualization instances in the environment of FIG. 1.

FIG. 5 is a block diagram of virtualization instances in the environment of FIG. 1. Referring to FIGS. 1 and 5, the computing resources include one or more physical servers 120 in a clustered or parallel environment for providing the computing services 122. In each server, a plurality of virtualization instances 150-1 . . . 150-3 (150 generally) execute for providing the services. As indicated above, in contrast to a multi-programming environment with a plurality of processes sharing the same processor and memory space from a common operating system, each instance 150 executes with a dedicated operating system 152 in its own address space 154-1 . . . 154-3. Each instance also executes using a dedicated virtual processor 156-1 . . . 156-3 (156 generally), emulated by the server 120 to perform as a particular type (i.e. speed and instruction set) and number (i.e. parallelism) of processor. In operation, however, the server 120 allocates computing resources (processor 156, operating system 152 and address space 154 (i.e. memory)) from the server 120 hardware to emulate the desired configuration 160-1 . . . 160-3 (160 generally). The desired configuration 160 is therefore defined by the processor type, number and memory allocated to the instance 150.

Upon configuration, each instance 150 is typically launched for executing a particular primary application 162-1.162-3 (162 generally). The primary application 162 is, for example, a database application, web server application, or other application which the instance 150 is designated for handling on behalf of the user 114. The desired configuration 160 is allocated for supporting the primary application 162 at a particular performance metric (i.e. N number of operations per unit time). However, other changes can mitigate this performance over time. For example, users often install additional applications 170-1 . . . 170-3 (170 generally), such as mail, word processing, and other extraneous applications in addition to the primary application 162. These additional applications 170 impose an extrinsic load on the instance 150 and contribute to a performance shortfall in achieving the performance metric of the primary application that the instance 150 was benchmarked to handle using the initial configuration 160.

Figure 6:
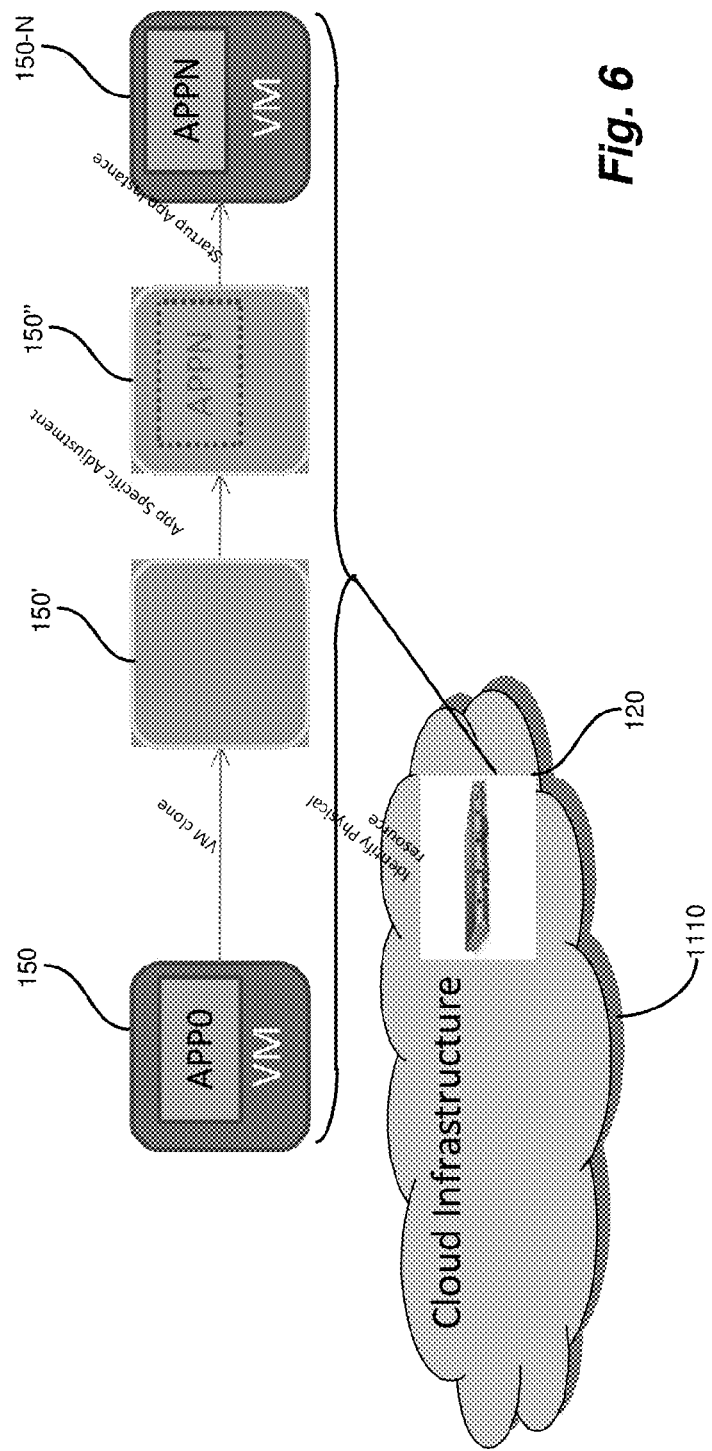
FIG. 6 is a diagram of application instance selection (elasticity) of the instances as in FIG. 5.

FIG. 6 is a diagram of application instance selection (elasticity) of the instances 150 as in FIG. 5. Referring to FIGS. 5 and 6, based on a demand for additional performance, defined in terms of operations of the primary application 162, the instance manager 123 responds to the demand by instantiating additional instances 150 (i.e. VMs). The responsiveness of the instance manager 123 to such an elasticity request demonstrates the elastic nature of the VMs 150 to "expand" and "contract" to meet surge/spike demands for additional operations and revert back to a normal load, thus conserving VMs 150 by avoiding over-allocation.

The cloud infrastructure 1110 supports one or more instances 150, each residing on a particular server 120 from among one or more servers 120-N in the cloud infrastructure 1110. The instance manager 123 selects one of the instances 150 for cloning of the target application APP0. The cloned instance 150' is based on a base or ideal configuration best suited for cloning, discussed further below at FIG. 8. The unmodified clone 150' undergoes application specific adjustment to avoid conflicting with the preexisting instance 150, such as allocation of different ports, IP addresses and other instance 150 specific designations, resulting in an application specific 150" having the same configuration (i.e. CPU and memory resources) as the instance 150 from which it was cloned. Additional configurations may be performed based on the computed optimal configuration. The instance manager 123 then launches the target (primary) application 162 in the instance 150", resulting in APPN executing on instance 150-N.

Figure 7:
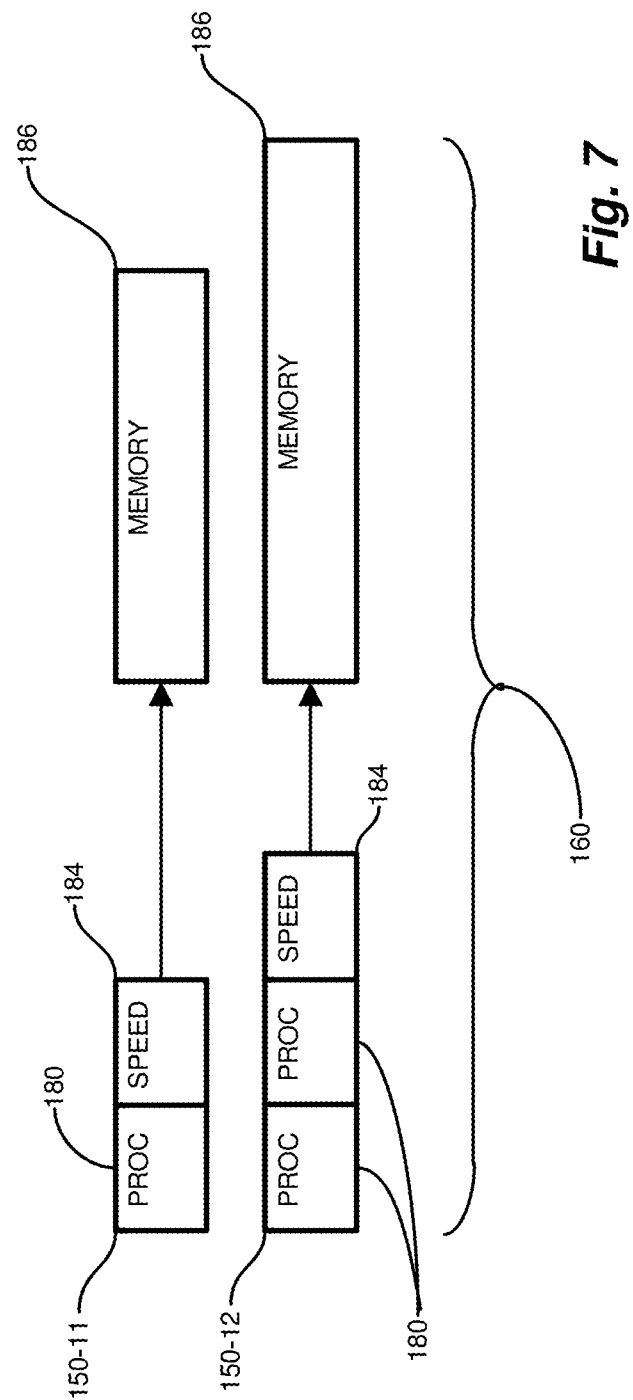
FIG. 7 is a diagram of configuration of a virtualization instance in the environment of FIG. 1.

FIG. 7 is a diagram of configuration of a virtualization instance 150 in the environment of FIG. 1. Referring to FIGS. 5-7, each virtualization instance 150-11, 150-12 is defined by the desired configuration 160 that specifies a processor type and number 180, a processor speed 184, and a memory allocation 186. A disk, or non-volatile storage quota, may also be specified. When a new instance 150 is called for, the instance manager 123 instantiates a revision of the desired configuration 160 based on the number of operations called for by the true computing demand required. The true computing demand results from an impact analysis, now discussed with respect to FIG. 8, which determines the additional instances 150 and configuration of each to support the request, and also determines if additional hardware resources (i.e. servers 150) are needed to satisfy the demand.

Figure 8:
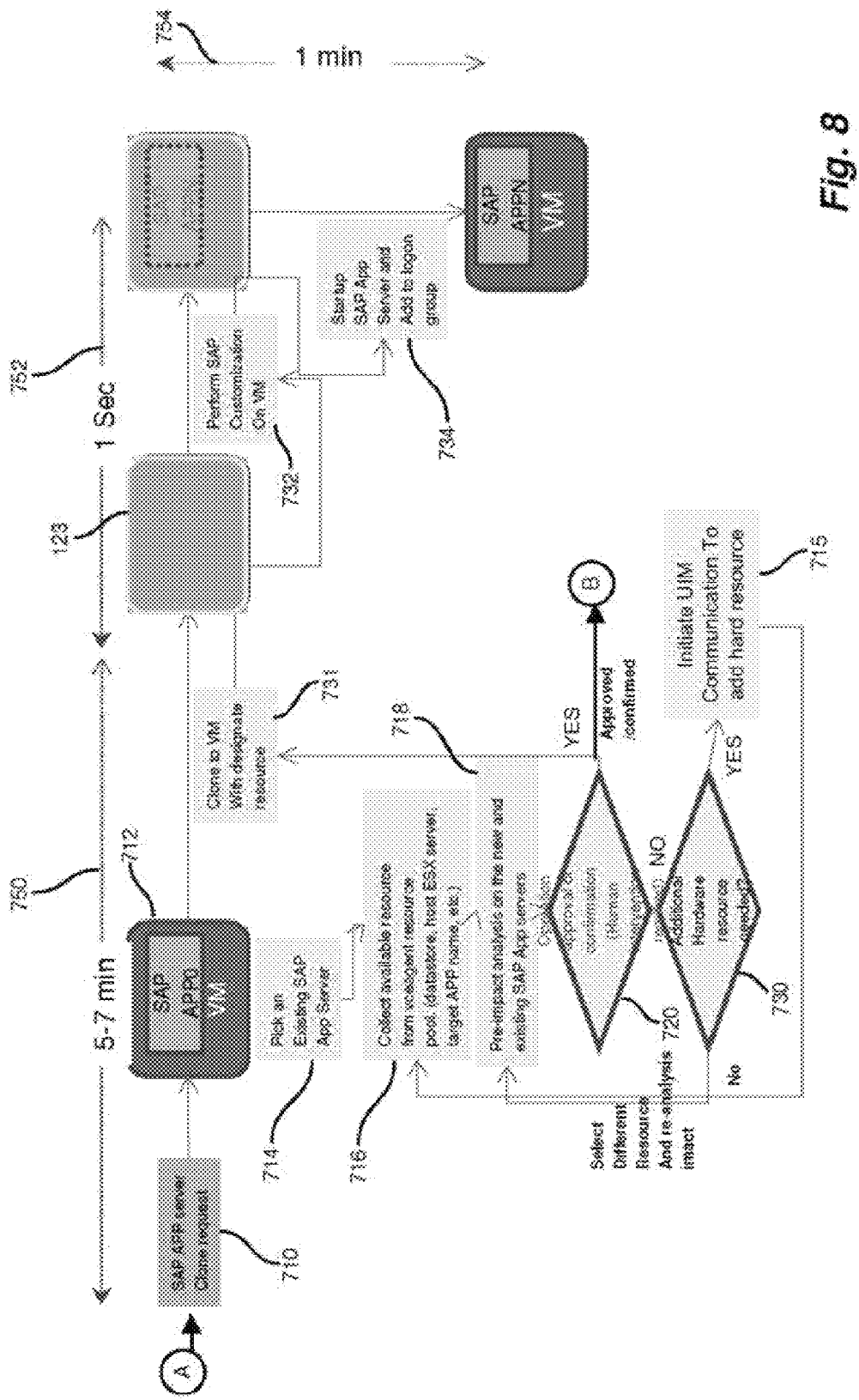
FIG. 8 is a flowchart of configuration of a virtualization instance as in FIG. 5.

FIG. 8 is a flowchart of configuration of a virtualization instance as in FIG. 5. Referring to FIGS. 5-8, FIG. 8 shows an example configuration of computing the impact analysis; alternate configurations may employ other computations for the impact analysis. Referring to FIG. 8, at step 710 a clone request is received, such as from a user interface for managing the instantiations 150, discussed below in FIGS. 11 and 12. Reconfigure logic 712 selects or receives a designation for the server 120 on which to clone (step 714). At step 716, a benchmark of existing resources for the cloned system 150' is collected, and the reconfigure process 712 begins the impact analysis at step 718. This corresponds to identifying the true performance of the cloned instance 150 (number of operations) and determining if the instantiation (150") meets the requested increase in operations. The reconfigure process 712 requests a confirmation at step 720, and if approved, control passes to step 731 ('A' and 'B' connectors are referred to below in FIG. 9). Otherwise, the reconfigure logic 712 determines if additional hardware resources (i.e. another virtualization server 120) is required (730). If so, at step 715 the operator is instructed to add additional servers 120, and control passes to step 716 for computing resource evaluation. If the existing hardware is sufficient, the impact analysis continues at step 718 to identify an acceptable configuration 160 for the added instance 150".

Upon approval at step 720, the virtualization manager (VM) 123 (instance manager) clones the existing instance 150' (step 731), and customizes the added instance 150" at step 732 for the approved revision of the desired configuration to increase target operations performed by the primary application (SAP, in the example shown). The instance manager 123 then launches the instance 150 as the using the revised configuration at step 734.

As shown by timeline 750, determination of the revised configuration occurs in 5-7 minutes, about 1 second to customize 752, followed by about 1 minute to launch 754 the new cloned instance 150", illustrating the timely response to a surge of user requests for additional services 122.

In the example above, memory and CPUs are manipulated as infrastructure variables for meeting a number of operations of a target application. Such operations define the units of a BAT (Business Application Throughput), such as the example operations above, for a particular application, hence defining a quantifiable measure of application throughput for a particular application. Discussed below is an extension of the infrastructure variables as a plurality of configurable parameters defining a computing resource. The infrastructure variables may be tuned to meet a BAT demand for a particular application, as discussed further in FIG. 12. Additionally, a single server (blade) may instantiate multiple virtualization instances on a single server such that the overall load encompasses BATs corresponding to different target applications. The virtualization server determines, for each identified virtualization instance, an operation performed by a hosted target application, such that the operation defines a metric for throughput of a plurality of target applications.

Optimal setting of the infrastructure variables is more granular than conventional approaches, in which the physical infrastructure handles such requests with a so-called 'oversize' method which leads to certain unnecessary idle resource. However, with virtualization technology two other issues emerge: (1) determination of clear guidance of best practice of VM configuration for certain business application (2) and procedures to resolve 'competing' situation raise from multiple VMs 150 on the same physical server 120 hosting different target applications. Configurations herein present an approach to the first issue using a methodology of progressive benchmark measurement for ideal VM configuration for certain business application throughput request, through which a library can be created to connect BAT (operations) to the ideal VM configuration in a cloud infrastructure 1110.

Configurations addressing the second issue employ logic based on the configurations of all VMs 150 on a physical server 120, the logic will calculate two extreme scenarios (a) all the VMs are running 100%. (b) Only the specific VM in concern runs while all other VMs are dormant. This calculation gives a guidance of the theoretical capacity range of a VM while making VM/resource allocation. A program utilizing these solutions can make best decision on both questions of 'what type of VM to create' and 'where to put the VM in the cloud' and provide elasticity to all mission critical applications.

As shown in FIG. 3, values for the infrastructure variables are varied to identify an optimal region, or "sweet spot", beyond which additional resources for that infrastructure variable plateaus, or fails to yield increasing throughput. The optimal region (zone) 1250 is defined by the point just prior to the plateau of the number of operations (performance based on BATs) resulting from the configuration defined by that point in the multidimensional mapping 1210. For example, in a configuration with 2 CPUs and 3 Gb of memory, the optimal zone 1250 is around 1210 operations 1252, or BATs. Increasing the memory 1120-2 alone (vertical axis) or the CPUs 1120-1 alone fails to increase the throughput 1252 significantly.

During the allocation of additional resources, the instance manager 123 thus identifies, in the multi-dimensional mapping 1210, an optimal zone 1250 indicative of infrastructure variables that maximize the application throughput. Computing the multidimensional mapping 1250 further includes performing a series of impact analyses, such that each impact analysis is based on a set of infrastructure variables defining available computing resources, and generating, from each impact analysis, a metric result indicative of an application throughput (i.e. operations) attainable with the set of infrastructure variables applicable to the impact analysis.

In further detail, determining the optimal zone 1250 includes varying the infrastructure variables 1120 in successive impact analyses until a plateau occurs in the computed result 1252 indicative of a limit in additional performance. A series of trials varies the infrastructure variables 1120 on each successive impact analysis to identify the optimal zone 1250 of infrastructure variable settings 1120. Additional infrastructure variables 1120 may be applied such that each of the infrastructure variables specifies a quantity of a configuration parameter for a virtualization instance, 150, in which the configuration parameter denoting a type and function of a computing resource provided by the virtualization instance, and results in an additional dimension to the multidimensional mapping 1210.

Figure 9:
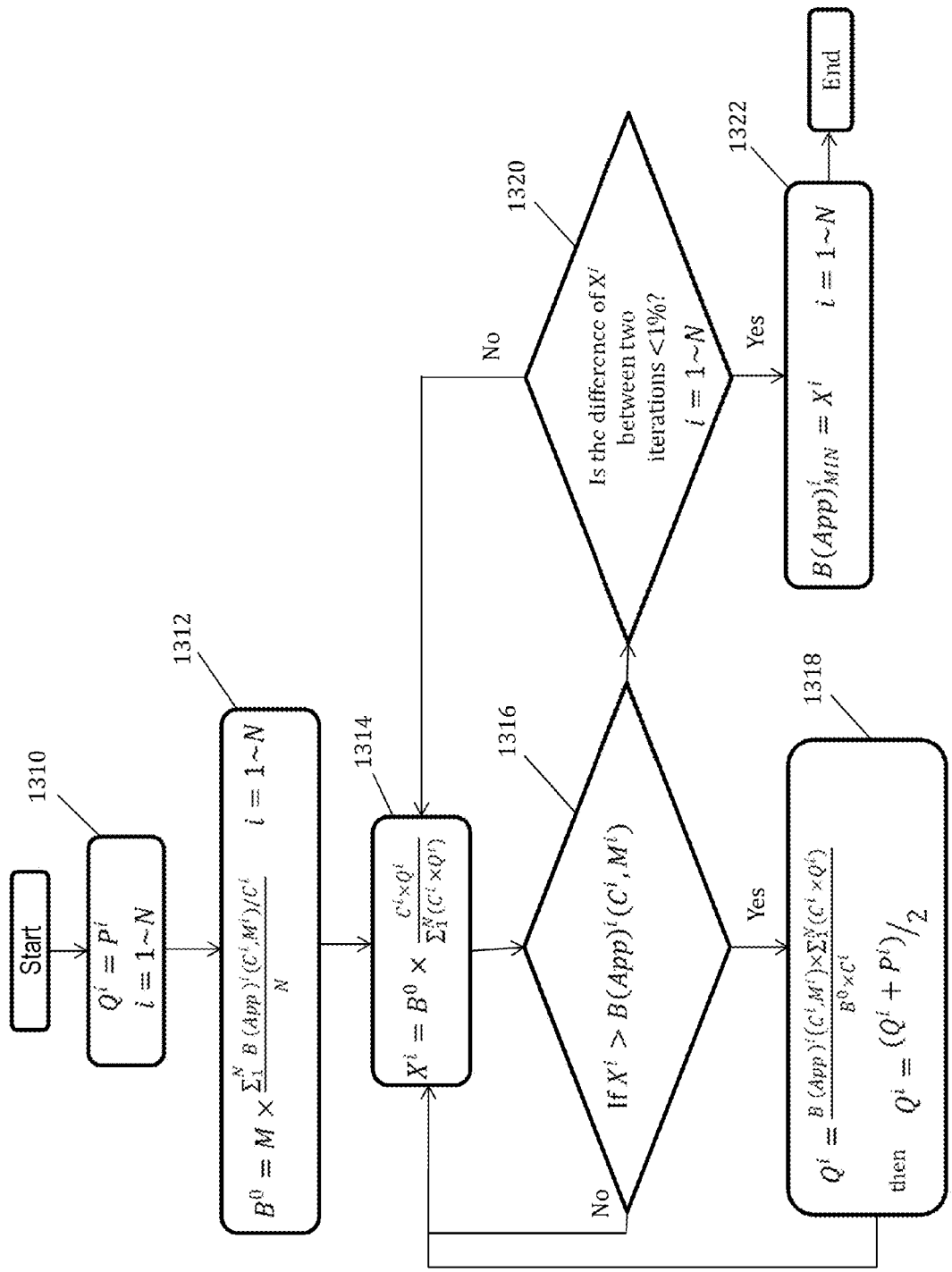
FIG. 9 shows the logic for calculating the minimum performance of a virtualization instance.

FIG. 9 shows the logic for calculating the minimum performance of a virtualization instance. Referring to FIGS. 1-5 and 9, an initial priority value is assigned (Q) and an iteration established for 1. N virtualization instances 150 on a server 150 (blade), as depicted at step 1310. A weighted average for all virtualization instances 150 is computed at step 1312, using C as the infrastructure variable 1120-2 for CPUs and M as the infrastructure variable 1120-1 for memory, with N denoting the number of virtualization instances 150 on the server 120. A throughput computation is performed by computing a partition of operations attributable to each virtualization instance i, as shown at step 1314. A check is performed, at step 1316, to compare a current throughput X of a virtualization instance 150 with a previous throughput value. If the current throughput X is greater, then the values for priority are redistributed, as shown at step 1318, and control reverts to step 1314. Otherwise, a check is performed, at step 1320, to determine when successive iterations differ by more less a predetermined threshold (such as 1%). If so, the minimum performance is achieved, at step 1322, otherwise, control reverts to step 1314.

Figure 10:
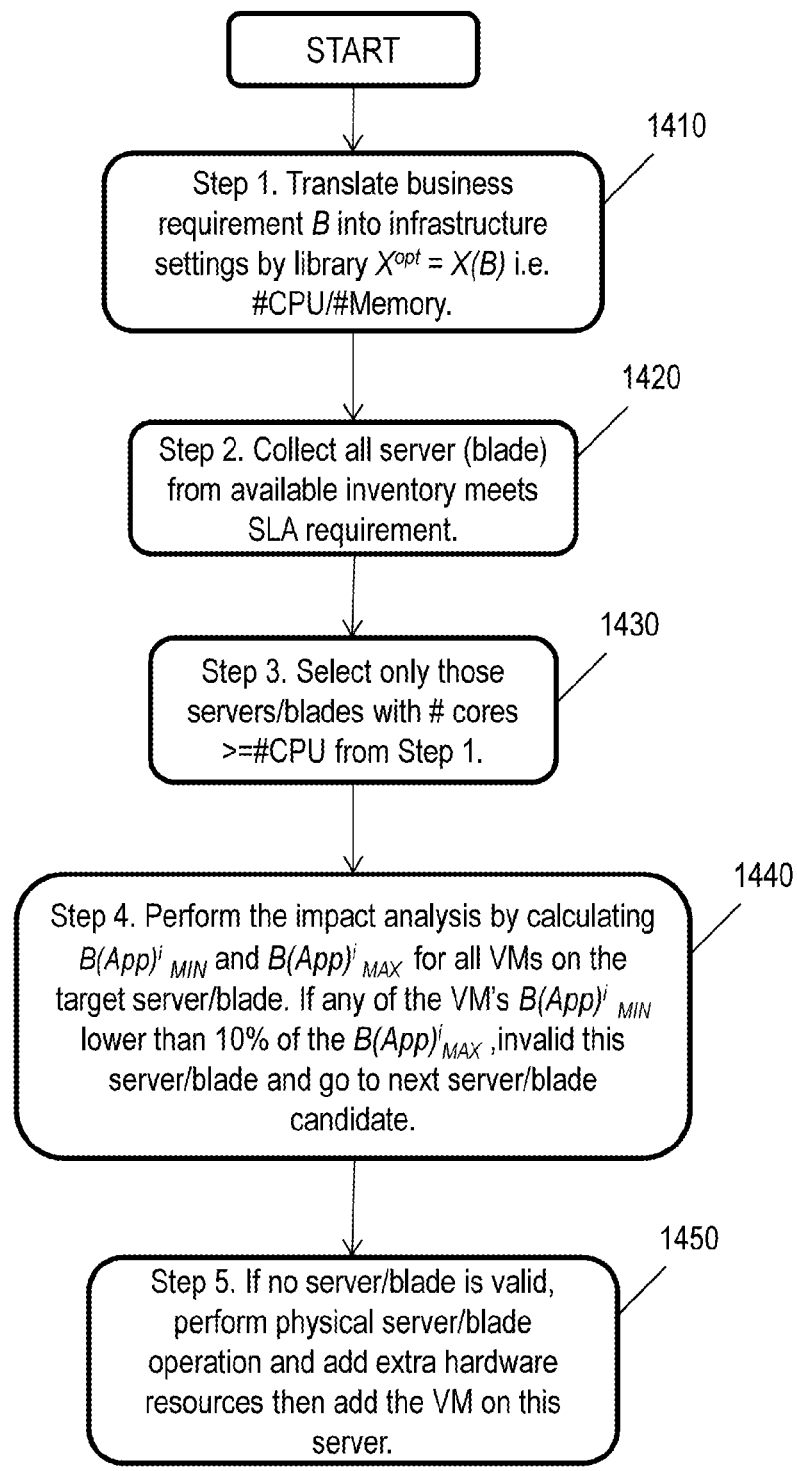
FIG. 10 shows the procedure for virtualization instance deployment using the maximums and minimums from FIG. 9.

FIG. 10 shows the procedure for virtualization instance deployment using the maximums and minimums from FIG. 9. Business requirements (performance metrics in terms of target application operations) are computed and the multidimensional mapping 1210 for available infrastructure variables 1120 developed including the optimal zone 1250, as shown at step 1410. Infrastructure variables may include memory, CPU speed, CPU number, CPU type, and IO capacity, to name several. The instance manager 123 collects current performance (throughput) from the available inventory of deployed virtualization instances 150, as shown at step 1420. As a preliminary matter, servers 120 lacking the prerequisite performance capability are eliminated, as shown at step 1430. From among the remaining servers 120, an impact analysis is performed using the throughout minimums of FIG. 9, and servers with a variation of greater than 10% between minimum and maximum throughput are eliminated, as shown at step 1440. If a server 120 is found that has available performance capability (current capacity and maximum capacity allow for an increase in a sufficient increase performance based on the business requirements of step 1410), the new virtualization instance is deployed on that server, otherwise a request for a new server (i.e. blade) is implemented, as depicted at step 1450.

Figure 11:
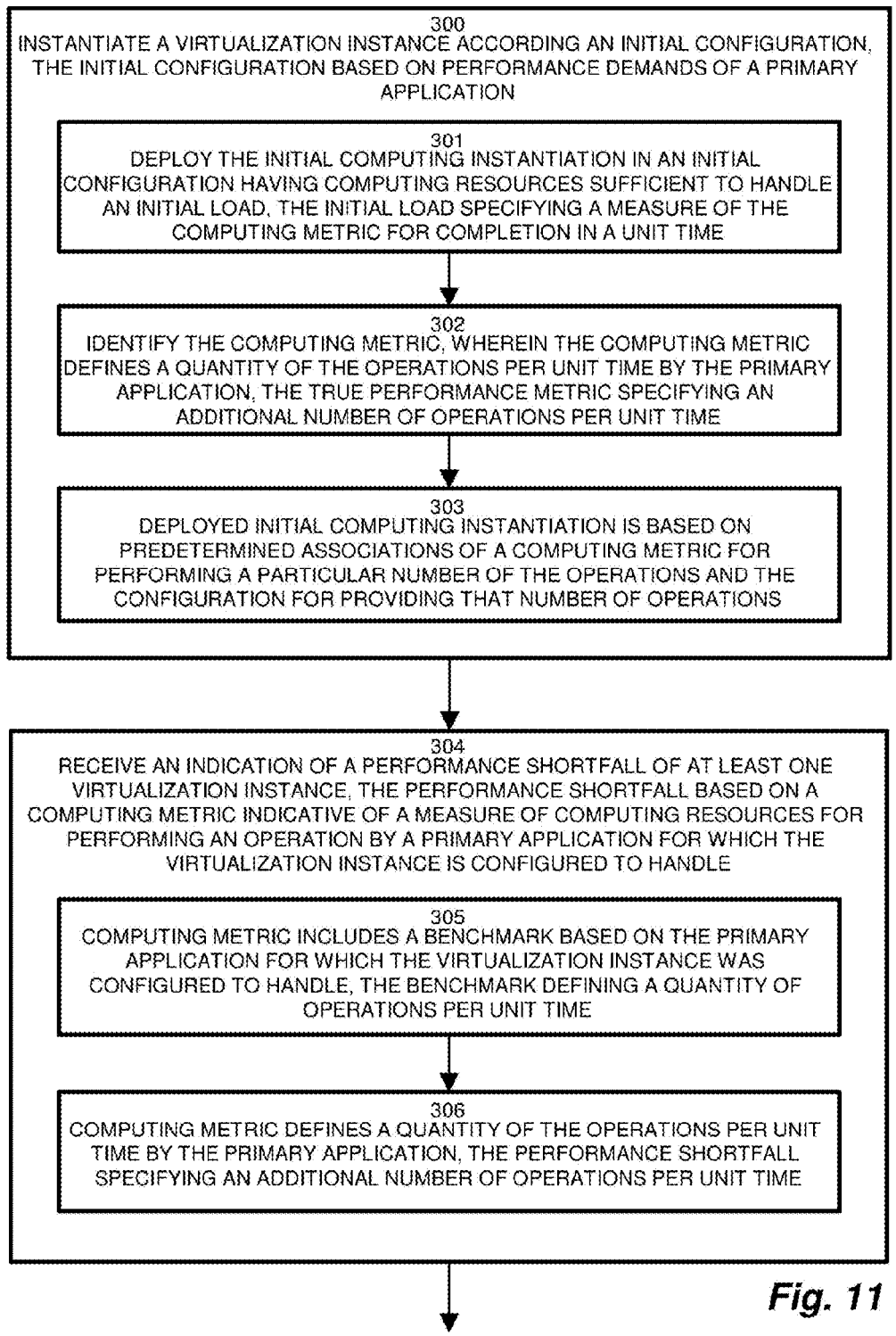
FIGS. 11-13 are a flowchart of computing resource configuration as in FIGS. 3-6.
Figure 12:
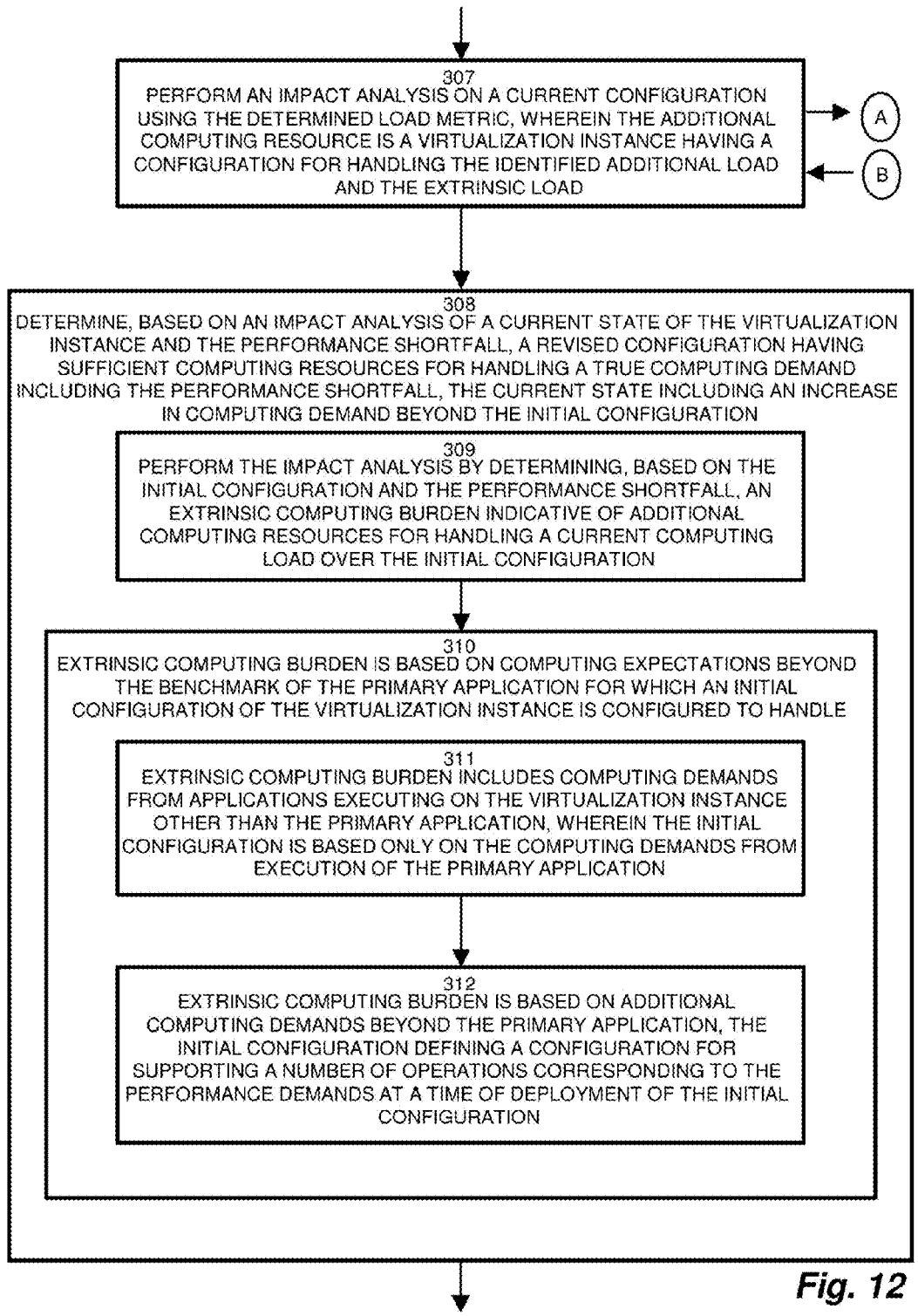
Figure 13:
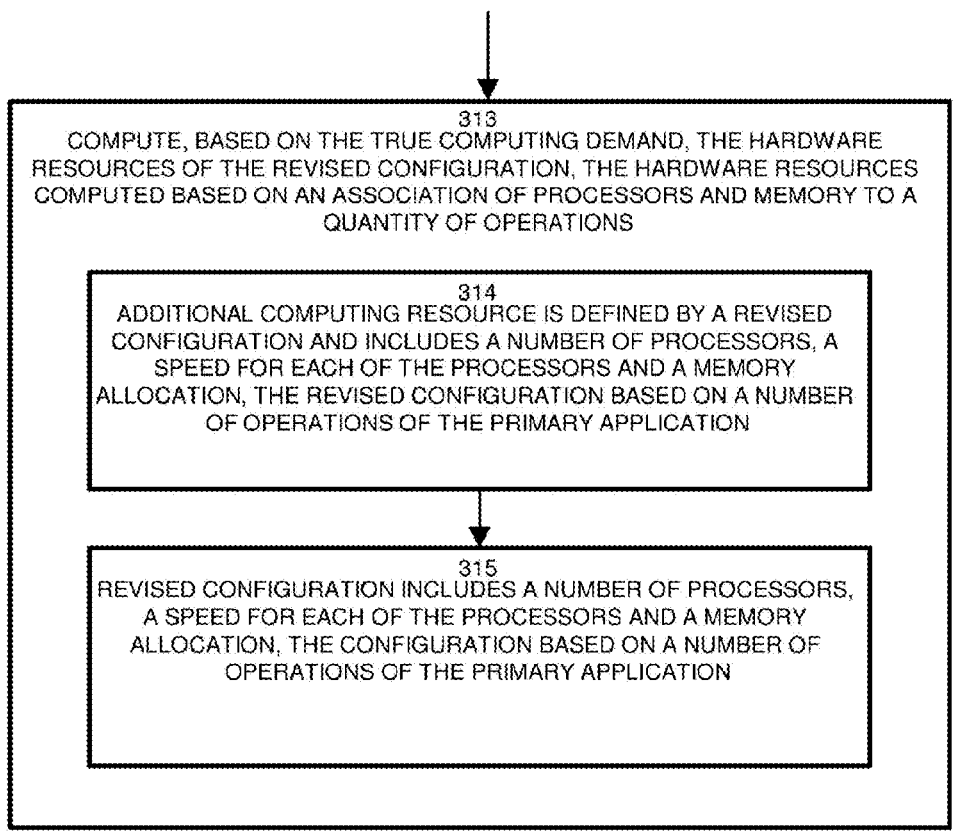

FIGS. 11-13 are a flowchart of computing resource configuration as in FIGS. 5-8. Referring to FIGS. 5-8 and 11-13, the method for configuring a virtualization instance as disclosed herein includes, at step 300, instantiating a virtualization instance 150 according an initial configuration, such that the initial configuration is based on performance demands of a primary application 162. The initial configuration is typically based on published guidelines associating a number of operations with a particular configuration of processors and memory for achieving the stated number of operations per a unit time (i.e. SAPs per hour) in an unencumbered system. This results in deploying the initial computing instantiation 150 in an initial configuration having computing resources sufficient to handle an initial load, such that the initial load specifies a measure of the computing metric for completion in a unit time, as disclosed at step 301. The deployed configuration identifies the computing metric, wherein the computing metric defines a quantity of the operations per unit time by the primary application 162, which may not be the same as a true performance metric specifying an additional number of operations per unit time on a burdened system, as depicted at step 302. Over time, the burden on the instance 150 may "creep" away from the initial load due to user installation and activity, overhead, etc., as the deployed initial computing instantiation 150 is based on predetermined associations of a computing metric for performing a particular number of the operations and the configuration for providing that number of operations, as disclosed at step 303.

At a later point in time, the user interface 500 receives an indication of a performance shortfall of at least one virtualization instance 150-N, in which the performance shortfall is based on a computing metric indicative of a measure of computing resources for performing an operation by a primary application 162 for which the virtualization instance 150 is configured to handle, as depicted at step 304. The computing metric includes a benchmark based on the primary application 162 for which the virtualization instance 150 was configured to handle, such that the benchmark defines a quantity of operations per unit time, as shown at step 305, and is usually derived from the primary application vendor using unburdened or dedicated instances, thus avoiding a more realistic assessment provided by the impact analysis. The computing metric employed defines a quantity of the operations per unit time by the primary application 162, and the performance shortfall specifies an additional number of operations per unit time deemed required for overcoming the shortfall, and is also often based on vendor published guidelines, as depicted at step 306. Computing the true performance metric is therefore based on an impact analysis of the computing instantiation 150 for determining computing burdens of additional software 170 installed and executing on the initial computing instantiation.

The reconfigure logic 712 or a related process perform an impact analysis on the current configuration using the determined load metric, wherein the additional computing resource is a virtualization instance 150 having a configuration 160 for handling the identified additional load 540 called for and the extrinsic load, as disclosed at step 307. One particular mechanism for performing the impact analysis is depicted in FIG. 7, as shown by the 'A' and 'B' branches; other mechanisms that assess the true performance metric by determining the additional load may also be employed. This involves, at step 308 determining, based on the impact analysis of a current state of the virtualization instance 150 and the performance shortfall, a revised configuration 150' having sufficient computing resources for handling a true computing demand including the performance shortfall, such that the current state includes an increase in computing demand beyond the initial configuration. Thus, performing the impact analysis includes determining, based on the initial configuration and the performance shortfall, an extrinsic load indicative of additional computing resources for handling a current computing load over the initial configuration 150'. The extrinsic load includes additional loads beyond the load imposed by the primary application 162 for which the initial computing instantiation was configured to handle based on the initial load, as disclosed at step 309.

The extrinsic computing burden (load) in the example arrangement is based on computing expectations beyond the benchmark of the primary application for which an initial configuration of the virtualization instance is configured to handle, as defined at step 310. Accordingly, the extrinsic computing burden includes computing demands from applications 170 executing on the virtualization instance 150 other than the primary application 162, wherein the initial configuration is based only on the computing demands from execution of the primary application 162 and thus omits other user created loads imposed, as depicted at step 311. The extrinsic computing burden is therefore based on additional computing demands beyond the primary application 162, wherein the initial configuration defines a configuration for supporting a number of operations corresponding to the performance demands at a time of deployment of the initial configuration, as disclosed at step 312.

Upon completion of the impact analysis, the instance manager 132 computes, based on the true computing demand, the hardware resources of the revised configuration, such that the hardware resources are computed based on an association of processors and memory to a quantity of operations, as depicted at step 313. The additional computing resource is defined by a revised configuration and includes a number of processors, a speed for each of the processors and a memory allocation, such that the revised configuration is based on a number of operations of the primary application, as shown at step 314. The revised configuration therefore includes a number of processors, a speed for each of the processors and a memory allocation, in which the configuration based on a number of operations of the primary application (SAPs, transactions, etc. depending on the primary application), as depicted at step 315.

Figure 14:
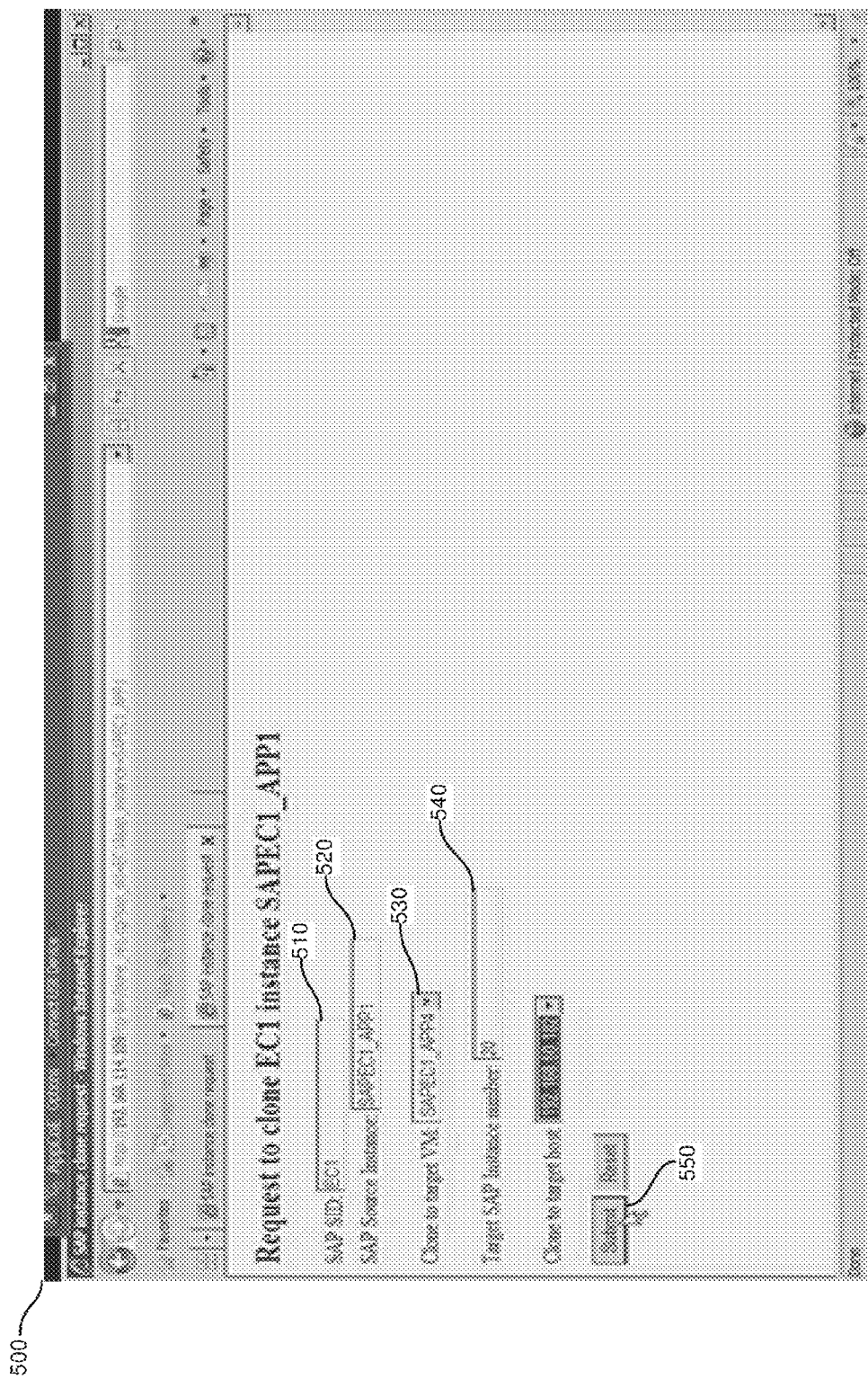
FIG. 14 is a screen view of a user interface for requesting resource allocation as in FIGS. 7 and 8

FIG. 14 is a screen view of a user interface for requesting resource allocation as in FIGS. 5-7. Referring to FIGS. 5-7 and 14, a clone request screen 500 prompts an operator to enter an system ID (SID) 510 and instance 520 of an virtualization instance 150' to be used as a basis for a cloned instantiation 150". Such a request may emerge from a noticeable decrease in performance, or a quantified allocation of a new user base, such as a corporate acquisition, for example. Other scenarios may be envisioned, however the general approach is responsive to an identified need to scale the resources for achieving a determined additional throughput. The cloned instantiation 150" inherits the configuration of the source cloned instance 520 (150') on the system 510, which refers to a physical server 120. The clone target 530 field specifies the location of the cloned instance 150" discussed further in FIG. 15 (below). A target operations field 540 receives the performance shortfall defined in terms of operations (SAPs, in the example shown) of the corresponding primary application (corresponding to the system ID, also discussed further in FIG. 15). The impact analysis employs the target operations field 540 along with the cloned instantiation 150' for determining the true performance demand required to actually achieve the increase in operations desired, using the current state of the cloned instantiation 150' rather than an initial benchmark that may have been used for a "pure" instantiation 150 (i.e. such as in initial deployment). A submit button 550 initiates the request.

Figure 15:
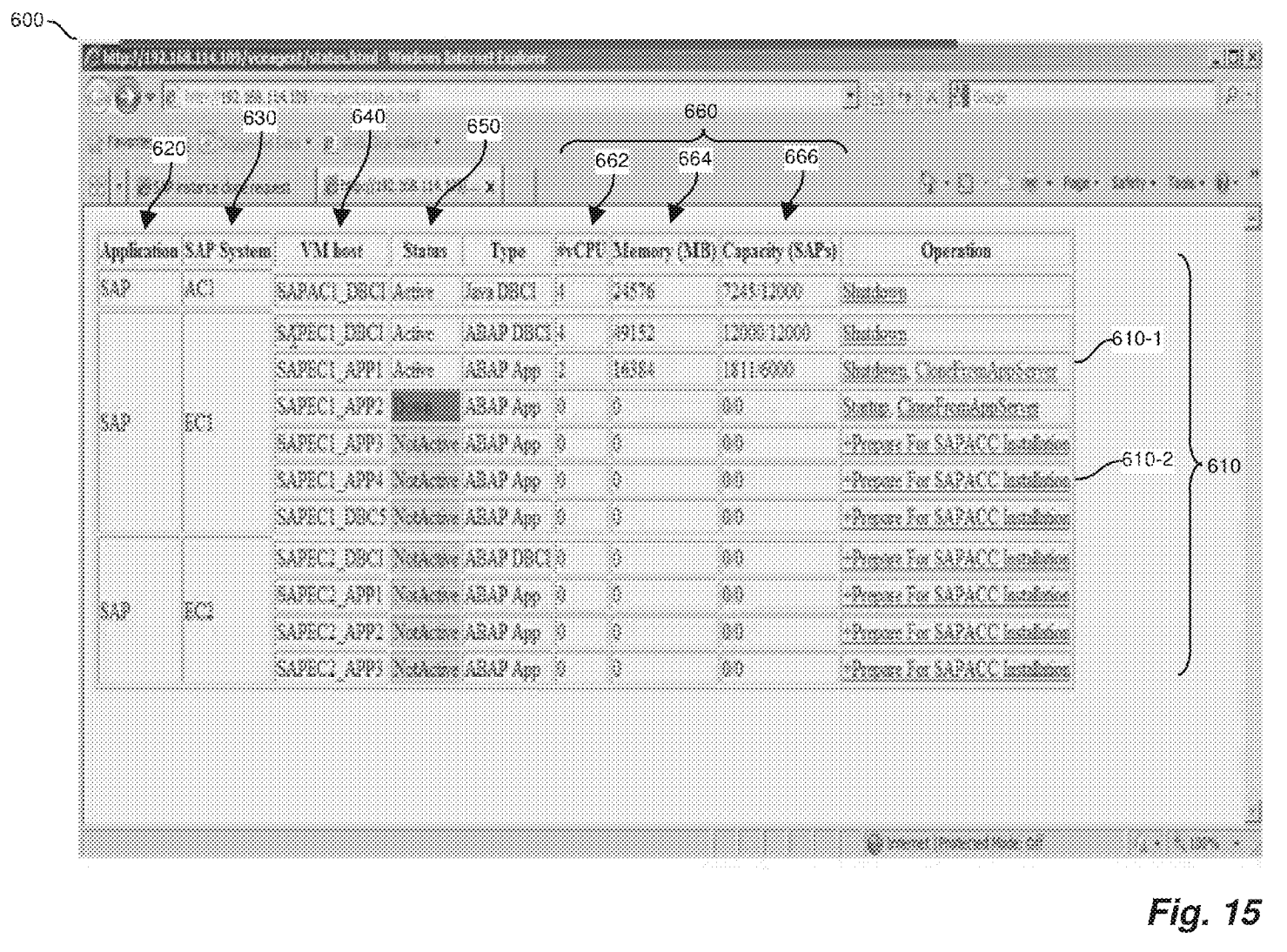

FIG. 15 is a screen view of additional computing resources configured in response to the request of FIG. 14. Referring to FIGS. 14 and 15, an instance status screen 600 displays entries 610 corresponding to each instance 150. An application entry 620 denotes the primary application on the system 630 where the instance 150 to be cloned resides. The host 640 indicates the virtual instance 150, and the status 650 indicates whether an instance 150 is active. Using the example of FIG. 15, entry 610-1 defines the cloned instance 150' (SAPEC1_APP1) and entry 610-2 defines the resulting instance SAPEC1_APP4 (150"). The configuration 160 of each instance 150 is shown in column 660, and includes the number of processors 662 and the memory 664. Processor type and applications (primary 162 and otherwise 170) are taken from the cloned instance 150'. The capacity 666 indicates the number of operations that each instance 150 is equipped to handle, and represents the requested operations (SAPs, in the example shown) resulting from the impact analysis.

It will be appreciated by those skilled in the art that alternate configurations of the disclosed invention include a multiprogramming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a non-transitory computer readable storage medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

What is claimed is:

1. A method for configuring a virtualization instance comprising:
   instantiating a virtualization instance according an initial configuration, the initial configuration based on performance demands of a primary application;
   receiving an indication of a performance shortfall of the virtualization instance, the performance shortfall based on a computing metric indicative of a measure of computing resources for performing an operation by a primary application for which the virtualization instance is configured to handle; and
   determining, based on an impact analysis of a current state of the virtualization instance and the performance shortfall, a revised configuration having sufficient computing resources for handling a true computing demand including the performance shortfall, the current state including an increase in computing demand beyond the initial configuration, wherein the true computing demand includes an extrinsic computing burden comprising additional computing demands separate from computing demands of the primary application.

2. The method of claim 1 further comprising computing, based on the true computing demand, the hardware resources of the revised configuration, the hardware resources computed based on an association of processors and memory to a quantity of operations.

3. The method of claim 1 further comprising performing the impact analysis by determining, based on the initial configuration and the performance shortfall, wherein the extrinsic computing burden is further indicative of additional computing resources for handling a current computing load over the initial configuration.

4. The method of claim 3 wherein the extrinsic computing burden includes computing demands from applications executing on the virtualization instance other than the primary application, wherein the initial configuration is based only on the computing demands from execution of the primary application.

5. The method of claim 3 wherein the initial configuration defines a configuration for supporting a number of operations corresponding to the performance demands at a time of deployment of the initial configuration.

6. The method of claim 1 wherein the revised configuration includes a number of processors, a speed for each of the processors and a memory allocation, the configuration based on a number of operations of the primary application.

7. The method of claim 6 wherein the computing metric defines a quantity of the operations per unit time by the primary application, the performance shortfall specifying an additional number of operations per unit time.

8. The method of claim 1 wherein the computing metric includes a benchmark based on the primary application for which the virtualization instance was configured to handle, the benchmark defining a quantity of operations per unit time, and the extrinsic computing burden is based on computing expectations beyond the benchmark of the primary application for which an initial configuration of the virtualization instance is configured to handle.

9. A computer program product having computer program code stored on a non-transitory computer readable medium for, in a virtual computing environment allocating instantiations of computing resources based on a computing metric of a primary application for execution on the instantiated computing resources, a method for increasing allocated computing resources comprising:

receiving a load metric indicative of an additional load on an initial computing instantiation executing a primary application, the load metric defining a measure of additional computing resources responsive to the additional load;

computing a true performance metric based on the received load metric for handling the additional load and an extrinsic load added after the initial computing instantiation, wherein the extrinsic load includes additional computing demands separate from computing demands of the primary application; and instantiating an additional computing resource configured based on the computed true performance metric.

10. The method of claim 9 wherein computing the true performance metric is based on an impact analysis of the computing instantiation for determining computing burdens of additional software installed and executing on the initial computing instantiation.

11. The method of claim 9 further comprising:

deploying the initial computing instantiation in an initial configuration having computing resources sufficient to handle an initial load, the initial load specifying a measure of the computing metric for completion in a unit time; and performing an impact analysis on a current configuration using the determined load metric, wherein the additional computing resource is a virtualization instance having a configuration for handling the identified additional load and the extrinsic load.

12. The method of claim 11 wherein the extrinsic load includes additional loads beyond the primary application for which the initial computing instantiation was configured to handle based on the initial load.

13. The method of claim 9 wherein the additional computing resource is defined by a revised configuration and includes a number of processors, a speed for each of the processors and a memory allocation, the revised configuration based on a number of operations of the primary application.

14. The method of claim 13 further comprising:

identifying the computing metric, wherein the computing metric defines a quantity of the operations per unit time by the primary application, the true performance metric specifying an additional number of operations per unit time.

15. The method of claim 14 wherein the deployed initial computing instantiation is based on predetermined associations of a computing metric for performing a particular number of the operations and the configuration for providing that number of operations.

16. A virtual computing environment comprising:

a virtualization server for executing an existing virtualization instance, the virtualization instance corresponding to an initial state, the initial state based on satisfying a computed load metric of a target application executing on the virtualization instance;

an operator interface operative to receive an indication of a performance shortfall of the existing virtualization instance, the performance shortfall indicating a measure of computing resources for mitigating the performance shortfall;

an instance manager for computing an extrinsic computing burden placed on the virtualization instance since the initial state, the extrinsic computing burden compromising the effectiveness of the existing virtualization instance toward handling the computed load metric, wherein the extrinsic computing burden includes additional computing demands separate from computing demands of the target application;

reconfigure logic operable to determine, based on the performance shortfall and the extrinsic computing burden, an increase in a measure of computing resources sufficient to mitigate the performance shortfall; and a host responsive to the reconfigure logic for instantiating a virtualization instance having a revised configuration based on the identified existing virtualization instance and a true performance metric calculated based on the increased measure of computing resources.

17. The environment of claim 16 wherein the host is responsive to, based on the true computing demand, the hardware resources of the revised configuration, the hardware resources computed based on an association of processors and memory to a quantity of operations.

18. The environment of claim 16 wherein the reconfigure logic is operable to performing an impact analysis by determining, based on the initial configuration and the performance shortfall, and wherein the extrinsic computing burden is further indicative of additional computing resources for handling a current computing load over the initial configuration.

19. The environment of claim 18 wherein the extrinsic computing burden includes computing demands from applications executing on the virtualization instance other than the target application, wherein the initial configuration is based only on the computing demands from execution of the target application.

20. The environment of claim 16 wherein the initial configuration defines a configuration for supporting a number of operations corresponding to the performance demands at a time of deployment of the initial configuration.

21. The environment of claim 20 wherein the initial configuration and the revised configuration each defines a set of cloud resources, the cloud resources defining a set of computing resources allocated for achieving the extrinsic computing burden.

22. The environment of claim 20 wherein the revised configuration identifies a set of cloud computing resources allocated and provided via deployment of at least one virtualization instance, the cloud computing resources including at least one of a number of processors, a type of processor, memory allocation, disk (non-volatile) allocation, network transmission capacity, QoS allotments, and response time.

23. The environment of claim 20 further comprising defining a plurality of applications, each application having a corresponding operation such that the initial and revised configuration correspond to a number of operations of a particular application, the reconfigure logic operable to determine the increase in the measure of computing resources based on the operation corresponding to the particular application.

24. A method of allocating virtual computing resources comprising:

computing a multi-dimensional mapping of infrastructure variables to application throughput, the infrastructure variables indicative of an allocation of a particular type of computing resource and the application throughput corresponding to operations performed by a target application;

identifying, in the multi-dimensional mapping, an optimal zone indicative of infrastructure variables that maximize the application throughput;

receiving a request for additional computing resources, the request indicative of additional application throughput;

determining, based on the additional application throughput and the multidimensional mapping, a server having sufficient resources for accommodating the additional application throughput; and instantiating a virtualization instance corresponding to the additional application throughput on the determined server.

25. The method of claim 24 wherein the determining the server further includes:

determining, from the multidimensional mapping, infrastructure variables sufficient to support the additional application throughput;

computing if a currently allocated server can support the virtualization instance; and deploying a new server if currently deployed servers are insufficient to accommodate the new virtualization instance.

26. The method of claim 24 wherein computing the multidimensional mapping further comprises:

performing a series of impact analyses, each impact analysis based on a set of infrastructure variables defining available computing resources; and generating, from each impact analysis, a metric result indicative of an application throughput attainable with the set of infrastructure variables applicable to the impact analysis.

27. The method of claim 26 wherein determining the optimal zone includes varying the infrastructure variables in successive impact analyses until a plateau occurs in the computed result indicative of a limit in additional performance.

28. The method of claim 27 further comprising varying the infrastructure variables on each successive impact analysis to identify the optimal zone of infrastructure variables.

29. The method of claim 24 wherein each of the infrastructure variables specifies a quantity of a configuration parameter for a virtualization instance, the configuration parameter denoting a type and function of a computing resource provided by the virtualization instance.

30. The method of claim 29 wherein infrastructure variables include memory, cpu speed, cpu number, cpu type, IO capacity.

31. The method of claim 24 wherein instantiating the virtualization instance further comprises:

identifying currently instantiated virtualization instances;

determining, for each identified virtualization instance, an operation performed by a hosted target application, the operation defining a metric for throughput of a plurality of target applications;

identifying, for each identified virtualization instance, a maximum throughput and a minimum throughput, the maximum and minimum throughput indicative of a range of operations performable by the virtualization instance; and selecting, based in the identified minimums and maximums, a server having sufficient capacity to support the virtualization instance in addition to the currently instantiated virtualization instances.

* * * * *